July 8, 1958 R. L. SUDHEIMER 2,842,098
ANIMAL HOLDER
Filed June 14, 1957 2 Sheets-Sheet 2
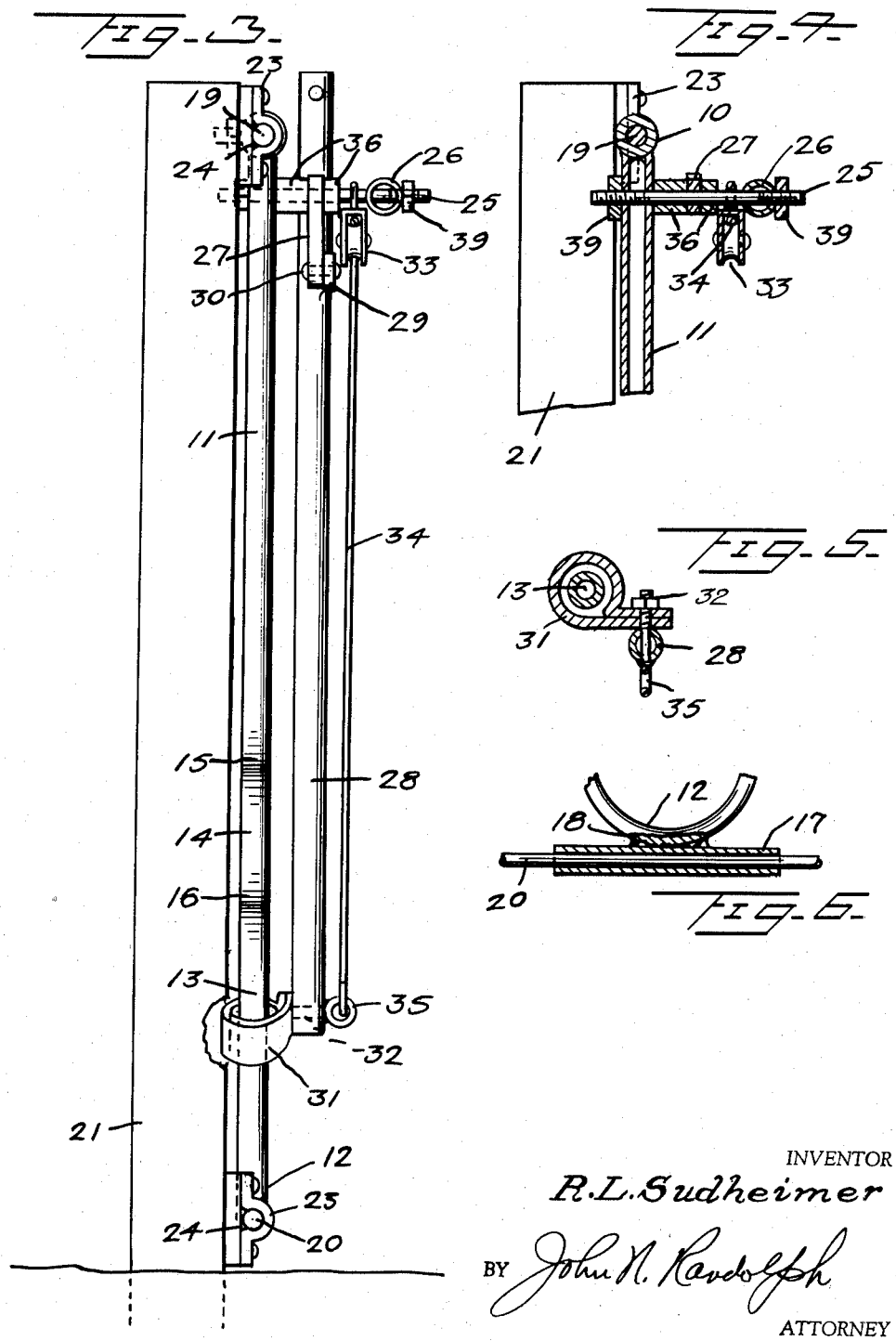
INVENTOR
R. L. Sudheimer
BY John N. Randolph
ATTORNEY

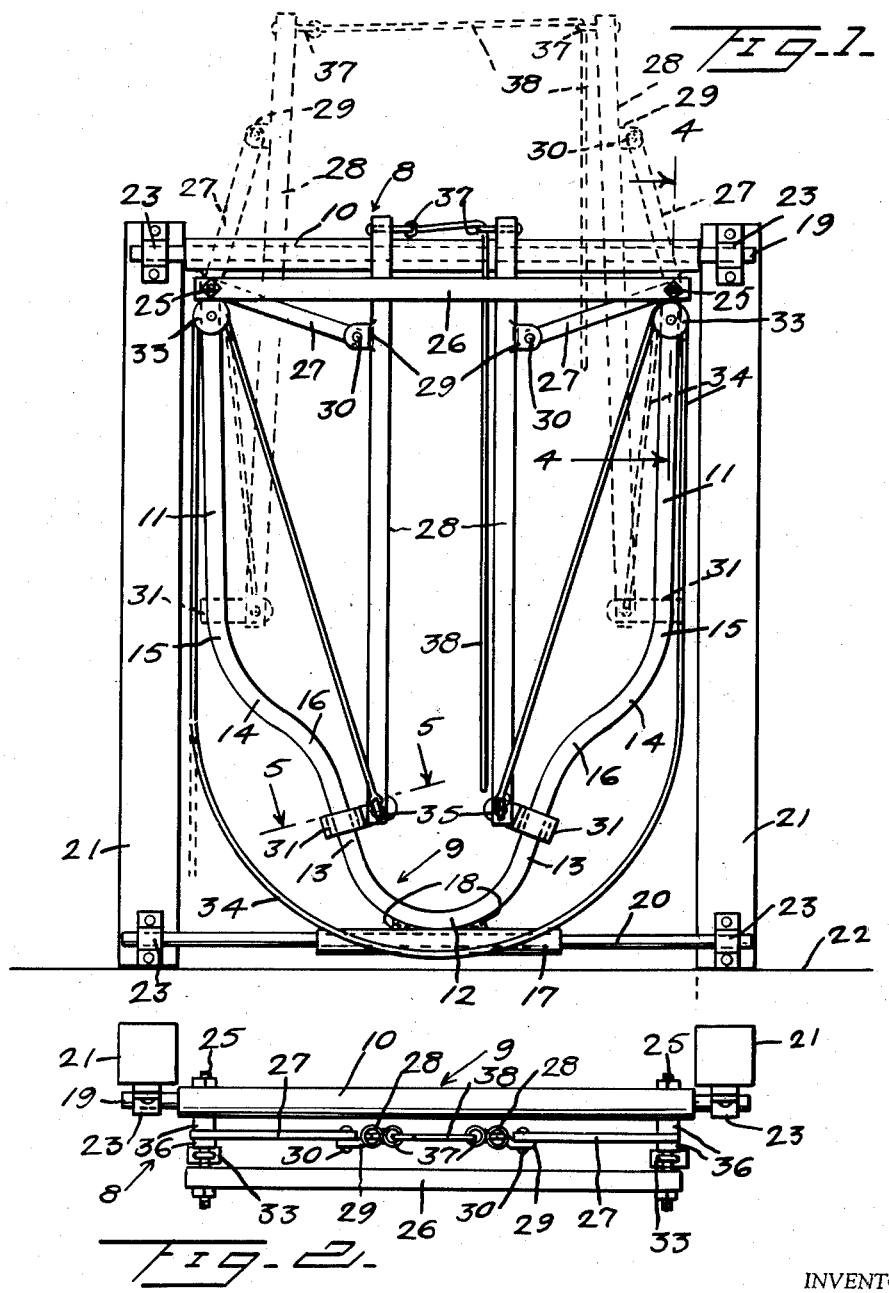

United States Patent Office 2,842,098
Patented July 8, 1958

2,842,098
ANIMAL HOLDER
Robert L. Sudheimer, Carbondale, Ill.

Application June 14, 1957, Serial No. 665,720

6 Claims. (Cl. 119—99)

This invention relates to a novel device for holding or restraining animals, especially cattle, and has for its primary object to provide a holder or gate which can be quickly and easily attached to spaced uprights and utilized for engaging the neck of an animal for restraining and holding the animal in a very humane manner.

More particularly, it is an aim of the invention to provide an animal holder or gate which can be attached to the uprights of any doorway or opening frame or to the end uprights of a conventional cattle chute, and which is adaptable to be mounted on uprights which are spaced different distances apart.

A further object of the invention is to provide an animal holder or gate which can be quickly and easily applied to or removed from spaced uprights, and which gate is sufficiently portable so that it can be carried in an automobile for use in different locations.

Still a further object of the invention is to provide an animal holder which is so constructed that when the holder or gate is in an open position animals can pass freely therethrough.

Another object of the invention is to provide a gate or holder having novel restraining jaws capable of being quickly and easily moved between open and closed positions so that with the jaws open, a number of animals can be permitted to pass freely through the gate, after which the jaws can be quickly moved to a closed position for engaging and holding a selected animal.

Still a further object of the invention is to provide a holder or gate which readily adapts itself to restrain and hold an animal from passing therethrough in either direction.

Other objects and advantages of the invention will hereinafter become more fully apparent from the following description of the drawings, illustrating a presently preferred embodiment thereof, and wherein:

Figure 1 is a front elevational view showing the gate in an applied position;

Figure 2 is a detailed top plan view thereof, with certain of the parts omitted;

Figure 3 is a side elevational view of the gate, looking from left to right of Figure 1, and on an enlarged scale;

Figure 4 is an enlarged fragmentary vertical sectional view, taken substantially along a plane as indicated by the line 4—4 of Figure 1;

Figure 5 is an enlarged fragmentary sectional view, taken substantially along a plane as indicated by the line 5—5 of Figure 1, and Figure 6 is a fragmentary vertical sectional view, partly in front elevation, of the lower portion of the holder or gate.

Referring more specifically to the drawings, the animal holder or gate in its entirety and comprising the invention is designated generally 8 and includes an elongated frame, designated generally 9, having a substantially straight horizontal and tubular top portion 10, substantially straight corresponding side portions 11, which are connected to and extend downwardly from adjacent the ends of the top portion 10, and a rounded bottom portion 12. The frame 9 includes corresponding lower portions 13 which form upwardly diverging extensions of the bottom portion 12, and other corresponding frame portions 14, which are disposed between the upper ends of the portions 13 and the lower ends of the frame sides 11 and which are flared outwardly with respect to said portions 13, so that the frame portions 14 form an angle with one another substantially greater than the angle formed by the lower frame portions 13. The parts 11, 12, 13 and 14 are preferably of one piece construction and are adapted to be formed from a length of relatively strong metal tubing. The portions 14 have oppositely curved ends the upper curved ends 15 of which merge integrally with the sides 11 and the other lower and oppositely curved ends 16 of which merge integrally with the upper ends of the lower frame portions 13.

A tube 17 is secured as by welds 18 to the bottom portion 12 of the frame and is disposed parallel to the tubular top portion 10. A rod or tube 19 extends slidably through and is detachably mounted in the upper tube 10, and a similar rod or tube 20 is detachably mounted in the lower tube 17.

In Figures 1 to 4, a pair of corresponding spaced uprights 21 are shown anchored in and extending upwardly from the ground 22. Said uprights 21 may form the upright parts of the frame of a doorway or other suitable opening or the end uprights of a cattle chute. The ends of the rods or tubes 19 and 20 are connected to corresponding sides of the uprights 21 by suitable clamps or strap members 23, in which said rod or tube ends may be clamped or slidably mounted. The clamps or strap members 23 thus form openings 24, as seen in Figure 3, through which the rods 19 and 20 extend. It will thus be apparent that if the spacing between the uprights 21 is sufficient the openings 24 can be bored directly through said uprights and the clamps or strap members 23 dispensed with. It will also be apparent that the tubes or rods 19 and 20 may be of various lengths for mounting the frame 9 on or between uprights 21 which are spaced different distances apart. It will also be apparent that by simply connecting the rods 19 and 20 to the frame 9 and uprights 21, that the holder or gate is thus mounted between said uprights, and by merely removing said rods from the uprights that the holder or gate 8 is removed.

Bolts 25 extend through the upper portions of the frame sides 11 and through an elongated guide member 26, near the ends of said guide member. The guide member 26 preferably comprises a rigid tube similar to the tubes of which the frame 9 is formed. The guide member 26 is supported by the bolts 25 spaced outwardly from the front side of the frame 9, in a direction away from the uprights 21. A bar 27 is swingably connected to each bolt 25 between the frame 9 and the guide member 26. Said bars 27 are swingably mounted on the bolts 25 adjacent corresponding ends thereof and form rigid links. A pair of elongated rods or tubes, forming jaws 28, have upper portions rigidly disposed between the upper frame member 10 and the guide member 26. Said jaws 28, near their upper ends, are provided with outwardly projecting apertured ears or lugs 29 to which the opposite ends of the links 27 are pivotally connected by pivot elements 30. As best seen in Figures 3 and 5, a loop member 31 is connected to the lower end of each jaw 28 by a nut and bolt fastening 32. Each loop member 31 is formed from a metal strap which is bent upon itself. The bolt of the fastening 32 extends through the strap ends and through the jaw 28. When the jaws 28 are in lowered positions as illustrated in full lines in Figure 1 and in Figure 3, the loops 31 loosely engage the lower frame portions 13.

A pulley block 33 is suspended from each bolt 25, between the link 27 thereof and the guide member 26. The end portions of a cable 34 are trained over the pulley blocks 33 and the cable ends extend downwardly from said pulley blocks and are anchored at their terminals to eyes 35 forming heads of the bolts of the fastenings 32. The links 27 are mounted on the bolts 25 between spacing collars 36, by means of which said links are held spaced from the frame member 10 and the pulley blocks 33. Eye members 37 are secured to and extend inwardly from the upper ends of the jaws 28. A flexible member or cable 38 has an end anchored to one of the eye members 37 and extends therefrom downwardly through the other eye member 37 to a point below the upper part of the frame 9, when the jaws 28 are in open positions as seen in dotted lines in Figure 1. The bolts 25 are preferably provided with threaded ends engaged by nuts 39, by means of which the frame sides 11, guide 26, links 27, pulley blocks 33 and spacing collars 36 are retained in position on said bolts.

By pulling on the intermediate portion of the flexible member or cable 34, the loops 31 will be caused to slide upwardly from their positions as seen in full lines to their dotted line positions of Figure 1, relative to the frame sides 13 and 14. The jaws 28 will move upwardly with the loops 31 causing the links 27 to swing upwardly to their dotted line positions of Figure 1 for fully opening the jaws 28. With the jaws 28 in fully open positions, cattle or other livestock can pass freely through the frame 9 in either direction, as the lower portion 12 of the frame is disposed in close adjacency to the ground level 22. Thus, cattle or livestock will be permitted to pass unobstructed through the animal holder or gate 8 until a selected animal reaches the gate. When this occurs, a downward pull is exerted on the depending end of the flexible member 38 and pressure is released on the flexible member 34 to cause the jaws 28 to move downwardly and inwardly. As the loops 31 slide down the inclined side intermediate frame portions 14 said loops and the lower ends of the jaws 28 move rapidly inward with respect to one another to quickly position the jaws in engagement with an animal's neck and so that the shoulders of the animal cannot pass therebetween. Thereafter the loops 31 move into engagement with and slide down the frame portions 13 which are disposed at a greater incline and more nearly parallel to one another than the portions 14, which causes the lower portions of the jaws 28 to move inwardly toward one another more slowly, but enables the lower portions of the jaws to be displaced toward one another with greater force resulting from the downward pull on the depending end of the flexible member 38. As this movement of the lower ends of the jaws 28 is occurring, the links 27 swing downwardly and inwardly to rapidly displace the upper portions of the jaws toward one another, and as the links 27 approach horizontal positions, so that the upper portions of the jaws cannot be swung further toward one another, the pull on the depending cable end 38 acts as a direct downward pull on the jaws 28 to effect a complete closing of the jaws, as seen in full lines in Figure 1. The cables 34 and 38 may be of any desired length so that the operator can be located at any desired distance from the gate 8 for operating said cables. The cable 34 may be operated with one hand and the cable 38 with the other hand. It will also be apparent that either end of the cable 34 may be pulled or released for movement of one jaw 28 independently of and relative to the other jaw 28.

Various modifications and changes are contemplated and may be resorted to, without departing from the function or scope of the invention as hereinafter defined by the appended claims.

I claim as my invention:

1. An animal holding gate comprising a frame through which animals are able to pass, means adapted to detachably mount said frame between spaced uprights and for positioning the lower portion of the frame adjacent the ground level, a pair of elongated jaws, means slidably connecting lower ends of said jaws to complementary lower portions of the frame, link members having corresponding ends pivotally connected to upper portions of the frame and extending inwardly therefrom and having inner ends pivotally connected to upper portions of said jaws, said lower frame portions extending upwardly and outwardly relative to one another, and manually actuated hoist means connected to said jaws and adapted to be manually actuated for exerting an upward pull on the jaws whereby said jaws are displaced away from one another by said second mentioned means moving upwardly relative to said lower frame portions and by upward and outward swinging movement of said links, and flexible means anchored to the upper end of one jaw and slidably connected to and extending downwardly from the other jaw for urging the jaws downwardly and inwardly when a downward pull is exerted on said flexible means.

2. An animal holding gate comprising a frame through which animals are able to pass, means adapted to detachably mount said frame between spaced uprights and for positioning the lower portion of the frame adjacent the ground level, a pair of elongated jaws, means slidably connecting lower ends of said jaws to complementary lower portions of the frame, link members having corresponding ends pivotally connected to upper portions of the frame and extending inwardly therefrom and having inner ends pivotally connected to upper portions of said jaws, said lower frame portions extending upwardly and outwardly relative to one another, and manually actuated hoist means connected to said jaws and adapted to be manually actuated for exerting an upward pull on the jaws whereby said jaws are displaced away from one another by said second mentioned means moving upwardly relative to said lower frame portions and by upward and outward swinging movement of said links, said lower frame portions including lower parts disposed at a lesser angle to one another than other upper parts of said lower frame portions whereby said jaws initially move more rapidly toward a closed position than during the final movement of the jaws to a closed position.

3. An animal holding gate comprising a frame through which animals are able to pass, means adapted to detachably mount said frame between spaced uprights and for positioning the lower portion of the frame adjacent the ground level, a pair of elongated jaws, means slidably connecting lower ends of said jaws to complementary lower portions of the frame, link members having corresponding ends pivotally connected to upper portions of the frame and extending inwardly therefrom and having inner ends pivotally connected to upper portions of said jaws, said lower frame portions extending upwardly and outwardly relative to one another, and manually actuated hoist means connected to said jaws and adapted to be manually actuated for exerting an upward pull on the jaws whereby said jaws are displaced away from one another by said second mentioned means moving upwardly relative to said lower frame portions and by upward and outward swinging movement of said links, said frame including a rounded bottom portion disposed between and merging with lower ends of said lower frame portions and a substantially horizontal top portion, a guide element spaced from and disposed substantially parallel to the upper portion of the frame, means connecting said guide element to the frame adjacent upper corners of said frame, portions of said jaws and links being disposed for up and down movement between said guide element and said top portion of the frame.

4. An animal holding gate comprising a frame through which animals are able to pass, means adapted to detachably mount said frame between spaced uprights and for positioning the lower portion of the frame adjacent the ground level, a pair of elongated jaws, means slidably connecting lower ends of said jaws to complementary lower portions of the frame, link members having corresponding ends pivotally connected to upper portions of the frame and extending inwardly therefrom and having inner ends pivotally connected to upper portions of said jaws, said lower frame portions extending upwardly and outwardly relative to one another, and manually actuated hoist means connected to said jaws and adapted to be manually actuated for exerting an upward pull on the jaws whereby said jaws are displaced away from one another by said second mentioned means moving upwardly relative to said lower frame portions and by upward and outward swinging movement of said links, said means slidably connecting the lower ends of the jaws to the frame comprising loop members slidably engaging said lower frame portions and pivotally connected to the lower ends of the jaws.

5. An animal holding gate as in claim 4, said hoist means including pulley blocks swingably mounted adjacent upper corners of the frame, and cable ends trained over said pulley blocks and extending downwardly and inwardly therefrom and connected to the lower ends of said jaws.

6. An animal holding gate comprising a frame through which animals are able to pass, means adapted to detachably mount said frame between spaced uprights and for positioning the lower portion of the frame adjacent the ground level, a pair of elongated jaws, means slidably connecting lower ends of said jaws to complementary lower portions of the frame, link members having corresponding ends pivotally connected to upper portions of the frame and extending inwardly therefrom and having inner ends pivotally connected to upper portions of said jaws, said lower frame portions extending upwardly and outwardly relative to one another, and manually actuated hoist means connected to said jaws and adapted to be manually actuated for exerting an upward pull on the jaws whereby said jaws are displaced away from one another by said second mentioned means moving upwardly relative to said lower frame portions and by upward and outward swinging movement of said links, said frame including a horizontal tubular top portion, a tubular member secured to the bottom of the frame and disposed substantially parallel to said top portion, said means detachably mounting the frame comprising elongated rigid elements extending slidably through said top portion and the tubular member and having ends detachably connected to the spaced uprights.

References Cited in the file of this patent

UNITED STATES PATENTS

| | | |
|---|---|---|
| 2,234,366 | Carter | Mar. 11, 1941 |
| 2,537,963 | Brunner | Jan. 16, 1951 |